April 25, 1961 W. L. HURFORD 2,981,793
SHADING VOLTAGE CIRCUITRY
Filed Aug. 1, 1955
2 Sheets-Sheet 1
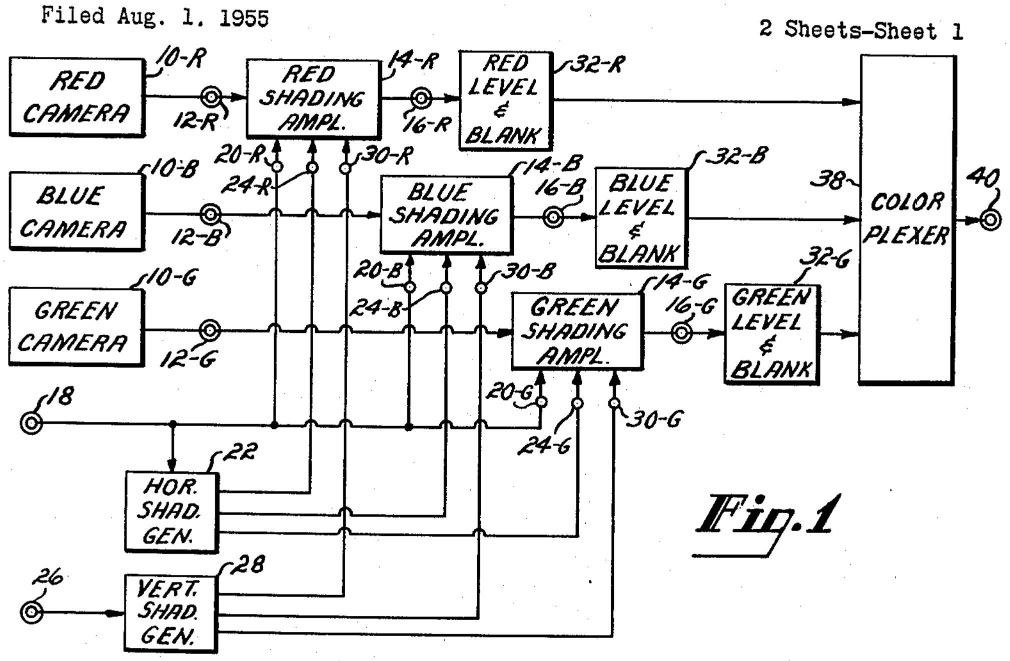
Fig. 1
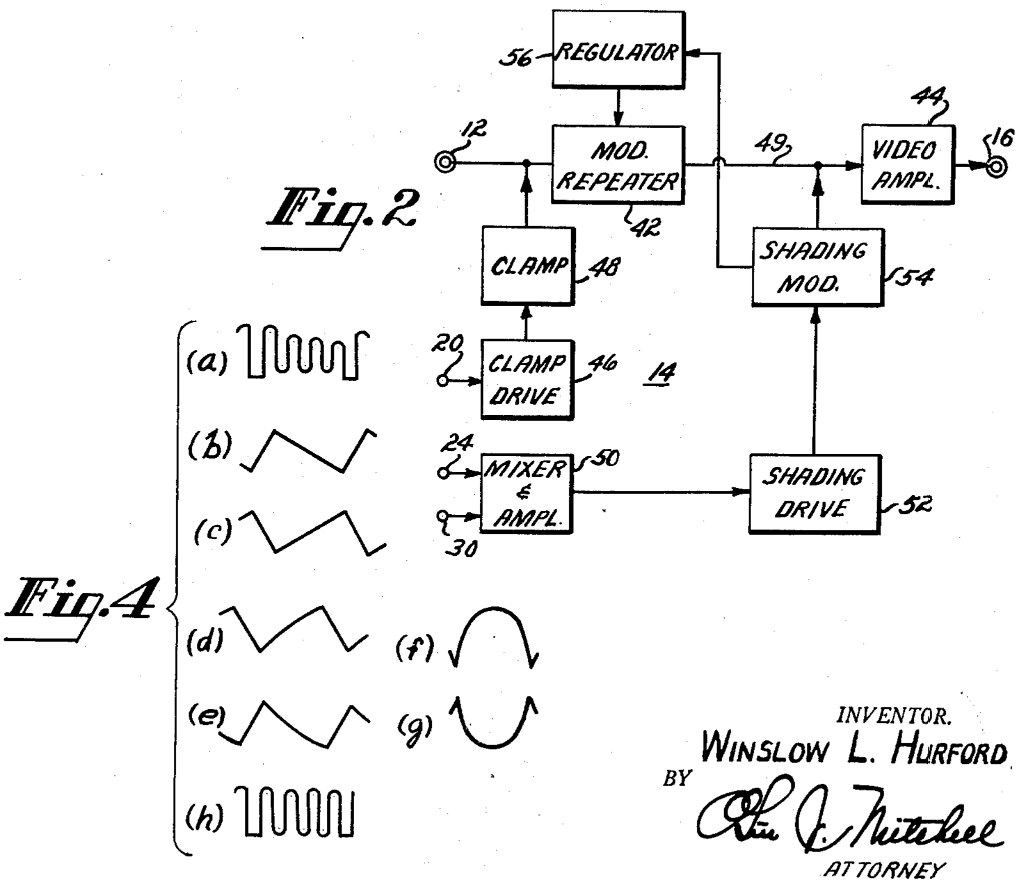
Fig. 2
Fig. 4
INVENTOR.
WINSLOW L. HURFORD
BY
[signature]
ATTORNEY April 25, 1961 W. L. HURFORD 2,981,793

SHADING VOLTAGE CIRCUITRY

Filed Aug. 1, 1955 2 Sheets-Sheet 2

INVENTOR.
WINSLOW L. HURFORD
BY
ATTORNEY

United States Patent Office 2,981,793

Patented Apr. 25, 1961

2,981,793

SHADING VOLTAGE CIRCUITRY

Winslow Leroy Hurford, Collingswood, N.J., assignor to Radio Corporation of America, a corporation of Delaware Filed Aug. 1, 1955, Ser. No. 525,695

8 Claims. (Cl. 178—7.2)

The invention relates to television transmission systems and more particularly to circuitry for compensating for image distortion produced by the varying sensitivity of photosensitive electrodes in television image pickup tubes.

In a television camera employing a storage type of image pickup tube, a signal is produced as light impinges on the photosensitive electrode in the tube. The television image signal is produced by scanning the photosensitive electrode upon which a scene is projected to derive a current proportional to the charge stored on the photosensitive electrode in accordance with the light impinging thereon from the scene to be televised. In present practice this scanning is carried out by deflecting an electron beam in the horizontal and vertical directions. The image pickup tubes presently available commercially are subject to certain discrepancies usually referred to by the artisan as "shading." Shading manifests itself by undesired gradual variations in the output signal wave of the image pickup tube.

In general, the tolerances of image pickup tubes presently manufactured are such that the shading errors produced are not always objectional in the case of monochrome or black-and-white television transmission systems, but in those systems where color images are to be reproduced the effect can be quite noticeable. This may be shown, for example, by televising a homogeneous yellow field. A yellow field is normally made up of equal quantities of red and green so that in the process of televising a yellow field, if the sensitivity of the red pickup is high on the right side, then the right side of the reproduced field will appear orange, thereby giving the false impression that the picture televised is actually orange on the right side.

There are several principal types of shading. One type called "background" or "axis shading," occurs where no light impinges on the photosensitive electrode of the pickup tube. This type of shading is principally due to non-uniformities of the tube structure and is most troublesome with the image orthicon tube wherein it is caused by non-uniformity of the surface of the first dynode in the electron multiplier portion. This type of shading is corrected by adding a compensating signal to the video signal output of the image pickup tube.

Another principal type of shading, termed "gain" or "modulation shading" is produced because of the structure of the photosensitive material deposited on the photosensitive electrode is often far from being a homogeneous layer throughout and therefore the sensitivity for the different portions of the electrode varies. This difference in sensitivity over the different parts of the area scanned results in an image signal which varies in magnitude whenever the electrode is exposed to light whose intensity remains the same over the various elements of the electrode. This type of shading is more serious in the vidicon and like image pickup tubes. Correction is made by the product of a shading voltage and the video wave so that, this type of shading requires special circuitry for shading voltage insertion although the same shading voltages used to compensate for axis shading may be used with circuitry according to the invention.

An object of the invention is to provide circuitry for producing an output voltage wave proportional to the product of a given video frequency wave and a shading voltage wave.

Another object of the invention is to provide a modulating circuit responsive to shading voltage signals of relatively high frequency to produce an output signal wave proportional to the product of the shading voltage and video frequency waves.

A further object of the invention is to provide a video frequency translating circuit having a sensitivity proportional to applied shading voltage waves to compensate for undesired shading variations.

According to the invention, a video signal repeating circuit, for example, a cathode follower, is connected to a clamping circuit arranged to bring the output terminals of the video signal repeating circuit to a point of an alternating current (A.-C.) reference potential. For example, the cathode electrode of a cathode follower is brought to the A.-C. reference potential during the blanking interval. A balance modulating circuit is coupled to the output terminal of the video signal repeating circuit, the cathode electrode in the example given, and driven by paraphase shading voltage waves, effecting a voltage dividing arrangement in conjunction with the internal impedance of the video signal repeating circuit. The division ratio is arranged as a function of the sensitivity controlling or shading voltage waves.

In order that the practical aspects of the invention may be fully appreciated and readily applied, an express embodiment is described, by way of example only, with reference to the accompanying drawing in which:

Fig. 1 is a functional diagram of portions of a color television transmission system incorporating circuitry according to the invention;

Fig. 2 is a functional diagram of one of the shading amplifiers shown in Fig. 1;

Fig. 4 is a series of graphical representations of waveforms appearing at various points in the shading amplifier circuit arrangement shown in Fig. 3.

Figure 3:
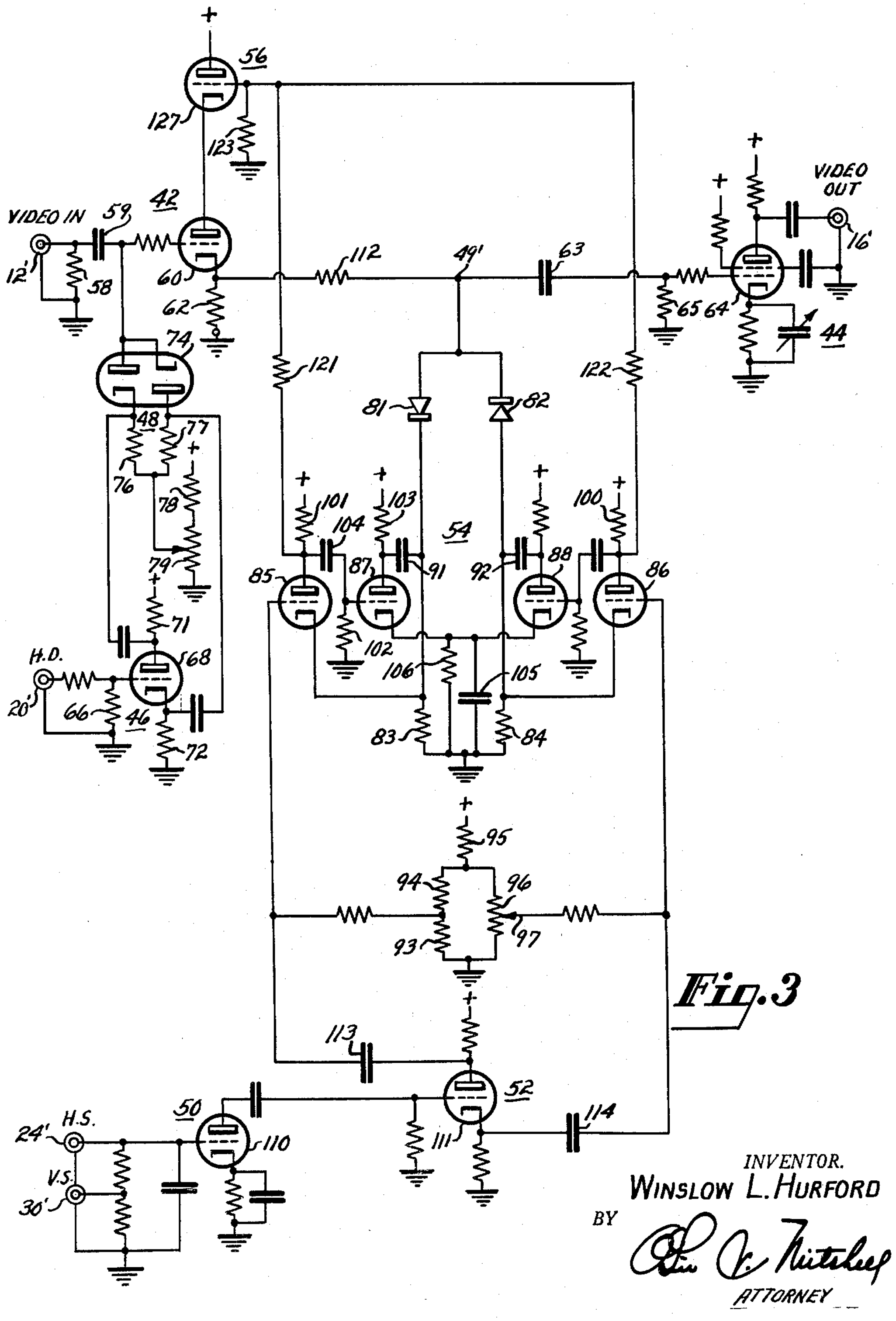
Fig. 3 is a schematic diagram of a shading amplifier according to the invention as outlined in Fig. 2.

A functional diagram of a complementary signal translating system in the form of a color television broadcasting system incorporating shading circuitry according to the invention is shown in Fig. 1. The component color signals from color television cameras 10–R, 10–B and 10–G, or other signal pickup devices, are presented at the input terminals 12–R, 12–B and 12–G of a plurality of shading and modulating amplifying circuits 14–R, 14–B and 14–G. There is one such amplifying circuit for each of the component colors. Shading corrected output signals are delivered to the output terminals 16–R, 16–B and 16–G. The correction is being determined by the application of horizontal synchronizing pulses and horizontal and vertical shading voltages. The horizontal synchronizing pulses are applied at horizontal synchronizing input terminals 18 and 20–R, 20–B and 20–G. Horizontal shading voltages are produced by a horizontal shading voltage generating circuit 22 coupled to the horizontal pulse terminals 18 and horizontal shading voltage input terminals 24–R, 24–B and 24–G. Vertical shading voltages are generated in response to vertical synchronizing pulses applied at vertical synchronizing pulse terminals 26 leading to the vertical shading generating circuit 28 which is coupled to the vertical shading voltage input terminals 30–R, 30–B and 30–G. The shading corrected component color signals at the output terminals 16–R, 16–B and 16–G are then applied to level and blanking amplifying circuits 32–R, 32–B and 32–G. These level and blanking amplifying circuits together with the shading amplifying circuits form processing ampilfiers, by which term those skilled in the art will readily recognize type of circuitry involved. In the interest of clarity however the shading amplifying circuits 14–R, 14–B and 14–G and the functions performed thereby have been separated from the remainder of the processing amplifiers. It may be desirable to use separate chassis for each of the two types of amplifying circuits or to combine them in one chassis. Whether separate or combined, these processing amplifiers are arranged so that the television broadcast station engineer is able to control the addition of blanking signals, vary the degree of pedestal setup, adjust the gain of each component signal, and according to the invention compensate for shading, and otherwise process the signals as required.

After processing, the component color signals are applied to the input terminals of a colorplexer 38, or other signal combining circuitry. It should be understood that the operation of the colorplexer in no way forms any part of the invention and that circuitry according to the invention is useful with many different types of colorplexers as required by type of color television signal transmission for which the television broadcasting system under consideration is established. The combined color signals from the colorplexer are available at the colorplexer output terminals 40 at which point the combined signals have been clamped, blanked, compensated for shading of the respective pickup tubes and otherwise put in the proper form for application to a visual signal broadcasting transmitter (not shown).

A shading amplifier 14 is shown in greater detail in the functional diagram of Fig. 2. A video signal from a color camera is applied at the input terminals 12 of a modulated repeating circuit 42 for application to the output terminal 16, with or without amplification in a video amplifying circuit 44. Horizontal synchronizing pulses applied at the terminals 20 are applied to a clamp driving circuit 46 which operates a clamping circuit 48 to clamp the output line 49 to a point of reference potential during the clamping interval. Horizontal and vertical shading voltages appearing at the corresponding input terminals 24 and 30 are applied to a mixing and amplifying circuit 50 which is coupled to a shading voltage driving circuit 52. The composite shading voltage is developed in paraphase relationship in the driving circuit 52 and applied to the shading modulating circuit 54 which is connected to the video output signal line 49. Further according to the invention a regulating circuit 56 is connected to the modulated repeating circuit 42 and is responsive to operation of the shading modulating circuit 54 to insure tracking of the electron discharge devices used in these two circuits despite variations in heater voltage during warm-up and subsequent operating periods.

A circuit arrangement for performing the functions outlined in Fig. 2 is given in the schematic diagram in Fig. 3. The video input signal applied at the input terminals 12′ is developed across an input resistor 58 and applied by means of a coupling capacitor 59 to the grid of a signal repeating triode 60. The triode 60 is connected in a cathode follower circuit having an output impedance element, shown as a resistor 62, connected between the cathode element and a point of fixed direct current (D.-C.) reference potential, shown as ground. Horizontal synchronizing pulses at horizontal input terminals 20′ are developed across a grid resistor 66 of a triode paraphase amplifying tube 68. Paraphase clamping pulses are developed across the anode and cathode resistors 71, 72 for application to a bi-directional clamping diode 74. During the blanking interval the black level of the video signal is clamped by the clamping circuit 48 to the reference potential determined by the setting of the arm of a potentiometer 79. The arm of the potentiometer 79 is adjusted so that the current drawn by the cathode follower tube 60 through the load impedance resistor 62 is just sufficient to bring the cathode electrode exactly to zero voltage with respect to the A.-C. reference potential. Under this condition there is no direct current flow in lead 49′ connected to the cathode electrode. The voltage across the load resistor 62 in the absence of video signal input, and also for black level video signal, is thus equal to the A.-C. reference potential.

Shading due to variations in the sensitivity of the photoconductive layer of a vidicon tube, for example, may now be corrected without affecting the black level of the video signal by effectively varying the gain of the signal repeating circuit 42 through the intermediary of the modulating circuit 54. The modulating circuit 54 is connected between the cathode electrode of the modulated signal repeating tube 60 and the point of fixed A.-C. reference potential, so that a voltage dividing arrangement is established in conjunction with the internal impedance of the cathode follower tube 60. The ratio of the output voltages is then made a function of the sensitivity controlling or shading voltage waves which are applied to the modulating circuit 54.

The video signal appearing across the output impedance element 62 is applied by means of a coupling capacitor 63 to the grid of a pentode video amplifying tube 64. The tube 64 is shown connected in a conventional video frequency amplifying circuit as an example of a circuit into which the modulated repeating tube 60 is to work.

The modulating circuit 54 is constituted, in the example shown, by a pair of unilateral conducting devices 81, 82 having unlike electrodes connected to the lead 49′. The other electrodes of the devices 81, 82 are connected to the fixed A.-C. reference potential through a pair of low impedance elements shown as resistors 83, 84. Actually the signal return for the unilateral conducting devices 81, 82 is made through the very low driving point impedance components of the modulator driving electron discharge devices 85, 86. The cathode impedance elements of the driving devices 85, 86 are connected respectively to the cathode and anode elements of the unilateral conducting devices 81, 82. The return impedance is determined by the parallel impedance components of the cathode resistor 83, or 84, and the mutual conductance $g_m$ of the discharge device 85, or 86, divided by the feedback return difference factor, which factor is equal to $1+a_e$ where $a_e$ is loop gain.

This very low driving point impedance is obtained by connecting a pair of modulating tubes 87, 88 to the modulator driving tubes 85, 86 in inverse feedback pair configuration. The anodes of the modulating tubes 87, 88 are coupled to the cathodes of the driving tubes 85, 86 respectively by coupling capacitors 91, 92 which also apply the output potentials of the modulating tubes 87, 88 to the cathode electrodes of the unilateral conducting devices 81, 82. The use of the feedback pair for lowering the source impedance of the modulating signal serves to increase the depth of modulation that is obtained from the modulating circuit 54. The grid electrodes of the driving tubes 85, 86 are returned to reference potential by means of the pair of potentiometer circuits. One of the potentiometer circuits is comprised by fixed resistors 93, 94 and the other is constituted by variably tapped resistance element or potentiometer 96. By adjusting the arm 97 of the potentiometer 96 a potential difference is established between the cathode electrodes of the driving tubes 85, 86 to force a polarizing current through the unilateral conducting devices 81, 82 to improve the symmetry of modulation.

Shading voltages, or shading signals, are applied in paraphase relationship to the grid electrodes of the driving tubes 85, 86. These shading voltages are obtained from known shading voltage generating circuitry and are usually in the form of sawtooth waves, substantially parabolic waves, and the like, alone or in combination as required by the particular image pickup tube under consideration. Also it should be understood that the shading voltage waves are usually of two repetition rates, one at the horizontal sweep frequency and the other at the vertical scanning rate. No circuitry is shown for generating such waves since neither the generating circuits nor the waveforms themselves form a substantial part of the invention. The proper horizontal shading voltage is applied to the horizontal input terminals 24' and in like manner vertical shading voltage is applied to the vertical terminals 30' and the two voltages are mixed in the input circuit of a shading voltage amplifying tube 110. The output shading voltage waves are applied to the grid of a shading voltage repeating tube 111 which produces the shading voltages waves in paraphase relationship for application to the driving tubes 85, 86. The paraphase shading voltages cause current to flow in the unilateral devices 81, 82 in proportion to the instantaneous amplitures of the shading voltages, varying the anode impedance of the unilateral conducting devices 81, 82 and hence varying the effective impedance from the output lead 49' with respect to the A.-C. reference potential, which may be taken as an A.-C. but not a D.-C. ground. This effective impedance in conjunction with the internal impedance of the cathode circuit of the cathode follower tube 60, serves as a variable voltage divider, dividing the video signal in response to the applied sensitivity controlling paraphase shading voltages. When the video signal is at black level, however, the voltage across the output impedance element or resistor 62 is zero and hence the output voltage is zero regardless of the value of the shading voltages, so that the black level is uneffected in transmission but the white level of the video signal is varied to compensate for the variations in sensitivity of the image pickup device. In general the depth of modulation may be increased by increasing the magnitude of the shading voltages or by inserting a resistance component 112 in the lead between the cathode of the cathode follower tube 60 and the connection to the modulating circuit 54. An increase of resistance of this component 112 will increase the obtainable depth of modulation. If necessary, small resistance elements can be inserted in series with the unilateral conducting devices 81, 82 for trimming the balance of the circuit.

Waveforms which may be found at various points of the circuit arrangement of Fig. 3 are given in Fig. 4. An input video wave representing an image comprising a series of black-and-white bars is shown in curve (*a*). Paraphase sawtooth shading voltages are shown in curves (*b*) and (*c*). Examples of combined sawtooth and parabolic waves as usually employed for the purpose are shown in curves (*d*) and (*e*), while the parabolic waves are shown in curves (*f*) and (*g*). An example of shading corrected video signal obtained at the output of the amplifier 44 is shown in curve (*h*). It should be noted that the waveform of the output image signal appearing between the blanking pulses is substantially the same as the input signal but the amplitude variation has been corrected to overcome the deceptive signal amplitude caused by the non-uniformity of the photosensitive material on the image pickup tube storage electrode.

A voltage regulator tube 127 is interposed in the lead from the anode electrode of the modulated cathode follower tube 60 and the source of direct energizing potential. The grid electrode of the regulating tube 127 is coupled to the anodes of the driving tubes 85, 86 by resistors 121, 122 respectively and to the point of reference potential by means of a grid resistor 123. This arrangement insures that the cathode potentials of the cathode follower tube 60 and the driving tubes 85, 86 track during warm-up and subsequent operating periods despite changes in heater voltage applied to the tubes. The cathode potential of the cathode follower tube 60 will remain midway between the potentials of the cathodes of the driving tubes 85, 86 and equal polarizing currents will flow through the unilateral conducting devices 81, 82. The three resistors 121, 122 and 123 form an adder circuit which determines the potential at the grid of the regulator tube 127 which is proportional to the currents drawn by the driving tubes through the cathode resistors 83, 84 and also through the anode load resistors 100, 101 respectively. Variations in the average currents in the driving tubes 85, 86 produce voltage changes across the respective load resistors 100, 101. These voltage changes are reflected through the voltage regulator tube 127 to vary the anode potential of the cathode follower tube 60. The current drawn by the cathode follower 60 will therefore produce a voltage drop across the output resistor 62 which is between the voltages produced across the cathode resistors 83, 84, thus maintaining the proper polarizing current through the unilateral conducting devices 81, 82.

The values below were used for the listed components for an embodiment of the invention as shown in Fig. 2 which provided fully satisfactory operation in a color television broadcasting system and are suggested as a guide in practice of the invention.

| Ref. No. | Component | Type or Value |
|---|---|---|
| 60 | Modulator repeater tube | 1/s. 5963. |
| 62 | Load resistor | 1,800 o. |
| 63 | Coupling capacitor | 0.1 mf. |
| 64 | Video amplifying tube | 6AH6. |
| 65 | Grid resistor | 1 Mo. |
| 68 | Clamping drive tube | 6BQ7A (parallel connected). |
| 74 | Clamping tube | 6AL5. |
| 76, 77 | Clamping resistors | 560 ko. |
| 78 | Dropping resistor | 560 ko. |
| 79 | Clamping level potentiometer | 0–10 ko. |
| 81, 82 | Modulator diodes | 1N34A. |
| 83, 84 | Cathode resistors | 1,100 o. |
| 85, 86 | Driving tubes | 5963. |
| 87, 88 | Modulating tubes | 6BQ7A. |
| 91, 92 | Coupling capacitors | 10 mf. |
| 93 | Potentiometer resistor | 5.1 ko. |
| 94 | Potentiometer resistor | 22 ko. |
| 95 | Series resistor | 820 ko. |
| 96 | Polarizing potentiometer | 0–10 ko. |
| 101 | Anode resistor | 20 ko. |
| 102 | Grid resistor | 4.70 ko. |
| 103 | Anode resistor | 10 ko. |
| 104 | Coupling capacitor | 0.022 mf. |
| 105 | Bypass capacitor | 20 mf. |
| 106 | Cathode resistor | 560 o. |
| 110, 111 | Shading voltage tubes | 6BQ7A. |
| 113, 114 | Coupling capacitors | 0.22 mf. |
| 120 | Voltage regulator tube | 1/s. 5963. |
| 121, 122 | Series resistors | 1.1 Mo. |
| 123 | Grid resistor | 2.7 Mo. |

The power supply used maintained a potential difference of 280 volts between the points marked with the plus (+) sign and ground.

The invention claimed is:

1. A shading amplifier circuit arrangement including, a signal repeating circuit having an internal impedance component and input and output terminals, a shading modulating circuit comprising a variable impedance component connected across said output terminals and responsive to applied voltages for effecting a series output voltage dividing arrangements in conjunction with said internal impedance component of said signal repeating circuit, and means to apply shading voltages to said modulating circuit, thereby to compensate at said output terminals for shading variations in the signal at said input terminals.

2. A shading amplifier circuit arrangement including, a signal repeating circuit having input and output terminals, a shading modulating circuit comprising a pair of unilateral conducting devices having unlike electrodes connected to one of said output terminals and other electrodes individually coupled to impedance components having terminals connected in common to the other of said output terminals of said signal repeating circuit, a shading voltage driving circuit connected to said shading voltage modulating circuit at the junctions of said unilateral conducting devices and said impedance components, and means to apply shading voltages to said driving circuit, thereby to compensate at said output terminals for shading variations in the signal at said input terminals.

3. A shading amplifier circuit arrangement including, a signal repeating circuit having input and output terminals, a clamping circuit connected to the input terminals of said signal repeating circuit, means to apply clamping voltage to said clamping circuit, a shading modulating circuit comprising a pair of unilateral conducting devices having unlike electrodes connected to one of said output terminals and other electrodes individually coupled to impedance components having terminals connected in common to the other of said output terminals of said signal repeating circuit, a shading voltage driving circuit connected to said shading voltage modulating circuit at the junctions of said unilateral conducting devices and said impedance components, and means to apply shading voltages to said driving circuit, thereby to compensate at said output terminals for shading variations in the signal at said input terminals and a regulating circuit coupled between said modulating and said repeating circuits.

4. A shading amplifier circuit arrangement including, a signal repeating circuit, an output impedance element connected to the output terminals of said repeating circuit, a modulating circuit coupled across said impedance element, said modulating circuit comprising a pair of unilateral conducting devices having unlike electrodes connected to one terminal of said impedance element and other electrodes individually connected to the other terminal of said impedance element through other impedance components and means to apply shading voltages of paraphase relationship across said other impedance components, said means comprising electron discharge devices for each phase, each of said electron discharge devices having a grid, a cathode and an anode, the cathodes of the electron discharge devices being connected together and coupled to the other terminal of said output impedance element, the anodes of said electron discharge devices being individually coupled to the other electrodes of said unilateral conducting devices, the grids of said electron discharge devices being coupled individually to the output terminals of a paraphase repeating circuit, and means to apply shading voltage waves to the input of said paraphase repeating circuit.

5. A shading amplifier circuit arrangement including, a signal repeating cathode follower, an output impedance element connected to the cathode electrode of said cathode follower, a modulating circuit coupled across said impedance element, said modulating circuit comprising a pair of unilateral conducting devices having unlike electrodes connected to said cathode electrode and other electrodes individually connected to the other terminal of said impedance element through other impedance elements, and means to apply shading voltages of paraphase relationship across said other impedance elements, said means comprising four electron discharge devices connected as feedback pairs for each phase, each of said electron discharge devices having a grid, a cathode and an anode, the cathodes of the output device of each feedback pair being connected together and coupled to the other terminal of said output impedance element, the anodes of said output devices being individually coupled to the other electrodes of said unilateral conducting devices, the grids of said output devices being individually coupled to the anodes of the other devices of said pairs, the cathodes of said other tubes being connected to said other impedance elements, the grids of said other devices being coupled individually to the output terminals of a paraphase repeating circuit, and means to apply shading voltage waves to the input of said pahaphase repeating circuit.

6. A shading amplifier circuit arrangement including, a signal repeating cathode follower, an output impedance element connected to the cathode electrode of said cathode follower, a modulating circuit coupled across said impedance element, said modulating circuit comprising a pair of unilateral conducting devices having unlike electrodes connected to said cathode electrode and other electrodes individually connected to the other terminal of said impedance element through other impedance elements, and means to apply shading voltages of paraphase relationship across said other impedance elements, said means comprising four electron discharge devices connected as feedback pairs for each phase, each of said electron discharge devices having a grid, a cathode and an anode, the cathodes of the output device of each feedback pair being connected together and coupled to the other terminal of said output impedance element, the anodes of said output devices being individually coupled to the other electrodes of said unilateral conducting devices, the grids of said output devices being individually coupled to the anodes of the other devices of said pairs, the cathodes of said other tubes being connected to said other impedance elements, the grids of said other devices being coupled individually to the output terminals of a paraphase repeating circuit, and means to apply shading voltage waves to the input of said paraphase repeating circuit, an electron discharge system interposed in the anode lead of said cathode follower and having a control element, and resistance components intercoupling the anodes of said other devices to the control element of said electron discharge system.

7. A shading amplifier circuit arrangement including, a signal repeating cathode follower, an output impedance element connected to the cathode electrode of said cathode follower, a modulating circuit coupled across said impedance element, said modulating circuit comprising a pair of unilateral conducting devices having unlike electrodes connected to said cathode electrode and other electrodes individually connected to the other terminal of said impedance element through other impedance elements, and means to apply shading voltages of paraphase relationship across said other impedance elements, said means comprising four electron discharge devices connected as feedback pairs for each phase, each of said electron discharge devices having a grid, a cathode and an anode, the cathodes of the output device of each feedback pair being connected together and coupled to the other terminal of said output impedance element, the anodes of said output devices being individually coupled to the other electrodes of said unilateral conducting devices, the grids of said output devices being individually coupled to the anodes of the other devices of said pairs, the cathodes of said other tubes being connected to said other impedance elements, the grids of said other devices being coupled individually to the output terminals of a paraphase repeating circuit, means to apply shading voltage waves to the input of said paraphase repeating circuit, a fixed potentiometer circuit connected between the grid of one of said other devices and two fixed potential points, and an adjustable potentiometer circuit connected between the grid of the other of said other devices and said two fixed potential points to polarize said unilateral conducting devices.

8. A shading amplifier circuit arrangement including, a signal repeating cathode follower, an output impedance element connected to the cathode electrode of said cathode follower, a modulating circuit coupled across said impedance element, said modulating circuit comprising a pair of unilateral conducting devices having unlike electrodes connected to said cathode electrode and the other electrodes individually connected to the other terminal of said impedance element through other impedance elements, and means to apply shading voltages of paraphase relationship across said other impedance elements, said means comprising four electron discharge devices connected as feedback pairs for each phase, each of said electron discharge devices having a grid, a cathode and an anode, the cathodes of the output device of each feedback pair being connected together and coupled to the other terminal of said output impedance element, capacitive coupling the anodes of said output devices to the other electrodes of said unilateral conducting devices, capacitive coupling the grids of said output devices to the anodes of the other devices of said pairs, the cathodes of said other tubes being connected to said other impedance elements, the grids of said other devices being coupled individually to the output terminals of a paraphase repeating circuit, means to apply shading voltage waves to the input of said paraphase repeating circuit, an electron discharge system interposed in the anode lead of said cathode follower and having a control element, resistance components intercoupling the anodes of said other devices to the control element of said electron discharge system, a fixed potentiometer circuit connected between the grid of one of said other devices and two fixed potential points, and an adjustable potentiometer circuit connected between the grid of the other of said other devices and said two fixed potential points to polarize said unilateral conducting devices.

References Cited in the file of this patent

UNITED STATES PATENTS 2,292,817 Bedford ---------------- Aug. 11, 1942